United States Patent
Utsumi

(10) Patent No.: US 9,223,527 B2
(45) Date of Patent: Dec. 29, 2015

(54) IMAGE-FORMING SYSTEM AND RECORDING MEDIUM

(71) Applicant: KYOCERA Document Solutions Inc., Osaka-shi, Osaka (JP)

(72) Inventor: Daisuke Utsumi, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 14/691,595

(22) Filed: Apr. 21, 2015

(65) Prior Publication Data

US 2015/0301774 A1   Oct. 22, 2015

(30) Foreign Application Priority Data

Apr. 22, 2014 (JP) ................................ 2014-088142

(51) Int. Cl.
*G06F 15/00* (2006.01)
*G06F 3/12* (2006.01)
*G06K 1/00* (2006.01)
*H04L 29/08* (2006.01)

(52) U.S. Cl.
CPC ............ *G06F 3/1268* (2013.01); *G06F 3/1285* (2013.01); *H04L 67/10* (2013.01)

(58) Field of Classification Search
USPC .................................................. 358/1.1–1.18
See application file for complete search history.

(56) References Cited

U.S. PATENT DOCUMENTS

| 8,345,277 B2 * | 1/2013 | Emori .......................... 358/1.14 |
| 2015/0092233 A1 * | 4/2015 | Park et al. .................... 358/1.15 |

FOREIGN PATENT DOCUMENTS

JP   2010157028 A   7/2010

* cited by examiner

*Primary Examiner* — Douglas Tran

(57) ABSTRACT

An image forming system includes a user terminal apparatus of a first user registered for a peer-to-peer type inter-user communication service, and a user terminal apparatus of a second user registered for the peer-to-peer type inter-user communication service and included in a contact list of the first user. The user terminal apparatus of the first user distributes operation data including (a) identification information of the first user, (b) identification information of the image forming apparatus, and (c) setting information or image information of printing to the identified user. The user terminal apparatus of the second user transmits, on the basis of an operation of the second user, an additional print request for additionally printing the same printed material for the printing of the first user, which was communicated by the received operation data, to an image forming apparatus of the identification information communicated by the received operation data.

9 Claims, 9 Drawing Sheets

IMAGE-FORMING SYSTEM AND RECORDING MEDIUM

INCORPORATION BY REFERENCE

The disclosure of Japanese Patent Application No. 2014-88142 filed on Apr. 22, 2014, including the specification, drawings and abstract is incorporated herein by reference in its entirety.

BACKGROUND

This disclosure relates to an image forming system and a recording medium.

In a system, when a user operates a terminal apparatus to perform printing, the terminal apparatus communicates schedule information to a terminal apparatus of another user, totalizes the required number of copies for the another user, and causes an output device, such as a printer and the like, to execute printing of copies of the totalized required number.

SUMMARY

According to an aspect of the present disclosure, an image forming system includes a user terminal apparatus of a first user registered for a peer-to-peer type inter-user communication service, a user terminal apparatus of a second user registered for the peer-to-peer type inter-user communication service and included in a contact list of the first user, and an image forming apparatus. The user terminal apparatus of the first user and the user terminal apparatus of the second user execute a peer-to-peer type inter-user communication program that realizes inter-user communication using the peer-to-peer type inter-user communication service. If the user terminal apparatus of the first user requests the image forming apparatus to perform printing on the basis of an operation of the first user, the user terminal apparatus of the first user identifies a user included in the contact list of the first user, on the basis of registration information of the first user registered for the peer-to-peer type inter-user communication service. The user terminal apparatus of the first user distributes operation data including (a) identification information of the first user, (b) identification information of the image forming apparatus, and (c) setting information or image information of the printing to the identified user. The user terminal apparatus of the second user receives the operation data, and displays the received operation data. The user terminal apparatus of the second user transmits, on the basis of an operation of the second user, an additional print request for additionally printing the same printed material for the printing of the first user, which was communicated by the received operation data, to the image forming apparatus of the identification information communicated by the received operation data. The image forming apparatus executes the printing on the basis of a request sent from the user terminal apparatus of the first user. If the image forming apparatus receives the additional print request from the user terminal apparatus of the second user, the image forming apparatus executes additional printing for the printing based on a request sent from the user terminal apparatus of the first user.

According to another aspect of the present disclosure, an image forming system includes an image forming apparatus at which a first user registered for a peer-to-peer type inter-user communication service logs in, and a user terminal apparatus of a second user registered for the peer-to-peer type inter-user communication service and included in a contact list of the first user. The image forming apparatus and the user terminal apparatus of the second user execute a peer-to-peer type inter-user communication program that realizes inter-user communication using the peer-to-peer type inter-user communication service. If the image forming apparatus executes document scanning or document copying on the basis of an operation of the first user in a log-in state, the image forming apparatus identifies, on the basis of registration information of the first user registered for the peer-to-peer type inter-user communication service, a user included in the contact list of the first user in a log-in state. The image forming apparatus distributes operation data including (a) identification information of the first user, (b) identification information of the image forming apparatus, and (c) setting information or image information of the document scanning or the document copying. The user terminal apparatus of the second user receives the operation data, and displays the received operation data. The user terminal apparatus of the second user transmits, on the basis of an operation of the second user, an additional print request for additionally printing the same printed material for the document copying of the first user or a transmission request for transmitting read image data acquired by the document scanning or the document copying to the image forming apparatus of the identification information communicated by the received operation data. If the image forming apparatus receives the additional print request or the transmission request from the user terminal apparatus of the second user, the image forming apparatus executes additional printing for the document copying of the first user or transmission of the read image data to user terminal apparatus of the second user.

According to still another aspect of the present disclosure, a non-transitory computer-readable recording medium is recorded an inter-user cooperation program executable by a computer of an electronic apparatus. The inter-user cooperation program causes a computer provided in a user terminal apparatus of a user registered for a peer-to-peer type communication service to execute a user identification step of identifying, if a request for printing is made to an image forming apparatus on the basis of an operation of the user, a user included in a contact list of the user on the basis of registration information of the user registered for the peer-to-peer type inter-user communication service, a distribution step of distributing operation data including (a) identification information of the user, (b) identification information of the image forming apparatus, and (c) setting information or image information of the printing to the identified user, and a request transmission step of receiving the operation data from a user terminal apparatus of another user, displaying the received operation data, and transmitting, on the basis of an operation of the user, an additional print request for additionally printing the same printed material for the printing of the another user, which was communicated by the received operation data, to the image forming apparatus of the identification information communicated by the received operation data.

DETAILED DESCRIPTION

Embodiments will be described below with reference to the accompanying drawings.

First Embodiment

Figure 1:
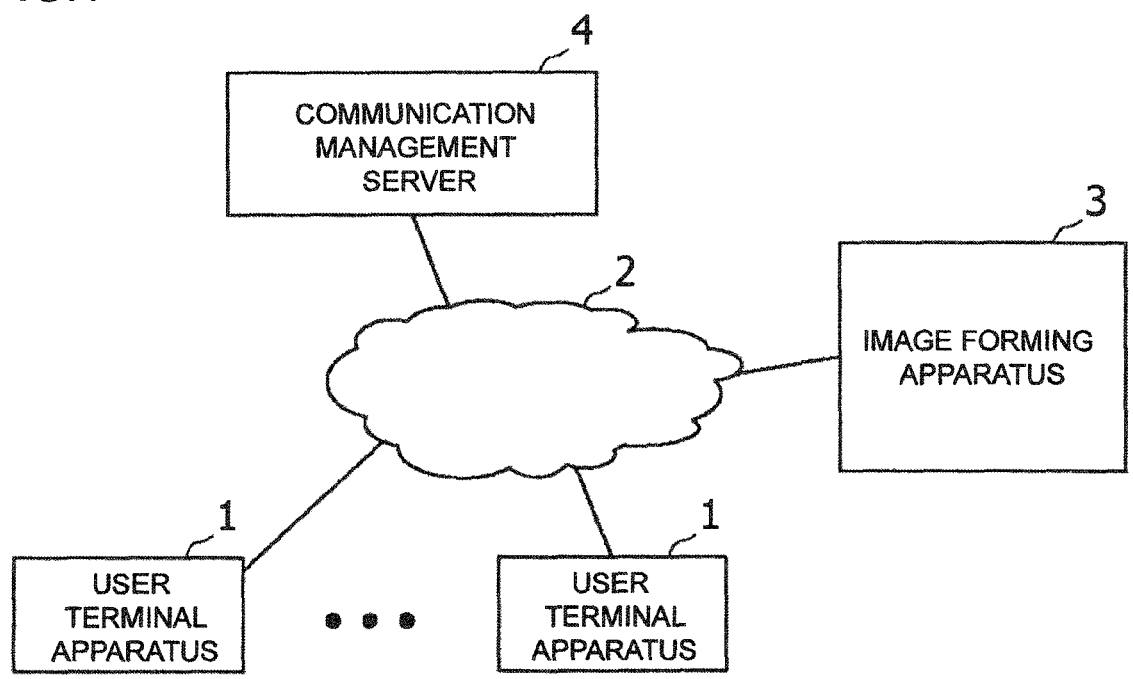
FIG. 1 is a block diagram illustrating a configuration of an image forming system according to a first embodiment of the present disclosure.

FIG. 1 is a block diagram illustrating a configuration of an image forming system according to a first embodiment. In the system illustrated in FIG. 1, a plurality of user terminal apparatuses 1 used by a plurality of users are coupled to a computer network 2 so as to be communicable with an image forming apparatus 3.

The plurality of users of the user terminal apparatuses 1 are registered for a peer-to-peer type inter-user communication service, such as Skype (registered trademark), LINE (registered trademark), and the like, with which calling, chatting, message exchange, and the like, may be performed, and are registered as users who are allowed to log in at the image forming apparatus 3, an authentication server, or the like. A communication management server 4 manages registration information (a user name, a destination list, setting information, and the like) for a registered user of the peer-to-peer type inter-user communication service, and executes connection control (establishment of connection and disconnection, and the like) between clients (that is, between the peer-to-peer type inter-user communication programs in the user terminal apparatuses 1) in accordance with a request sent from a client.

Figure 2:
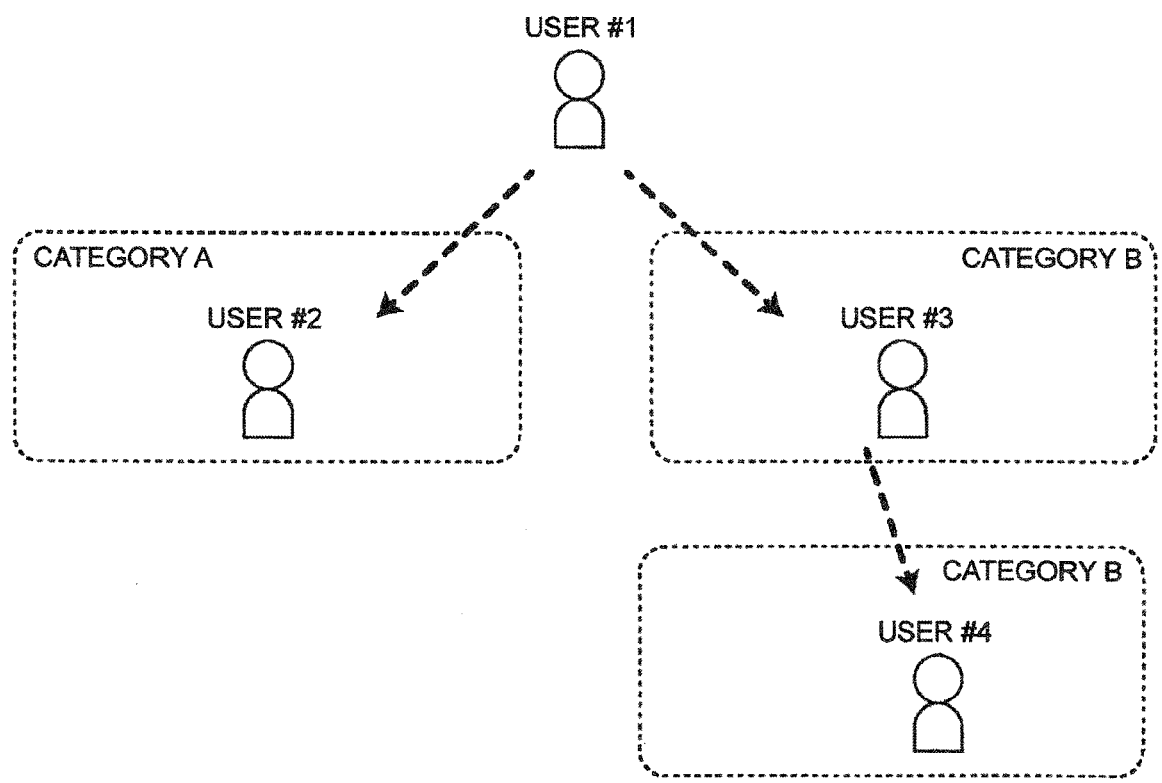
FIG. 2 is a diagram illustrating an example relationship among a plurality of users on a peer-to-peer type inter-user communication service.

FIG. 2 is a diagram illustrating an example relationship among a plurality of users on a peer-to-peer type inter-user communication service. In an example illustrated in FIG. 2, a user #2 and a user #3 are registered in a contact list of a user #1, the user #2 is categorized in a category A, and the user #3 is categorized in a category B. The user #1 and a user #4 are registered in a contact list of the user #3. Examples of categories include, for example, "friends", "work", and the like.

Figure 3:
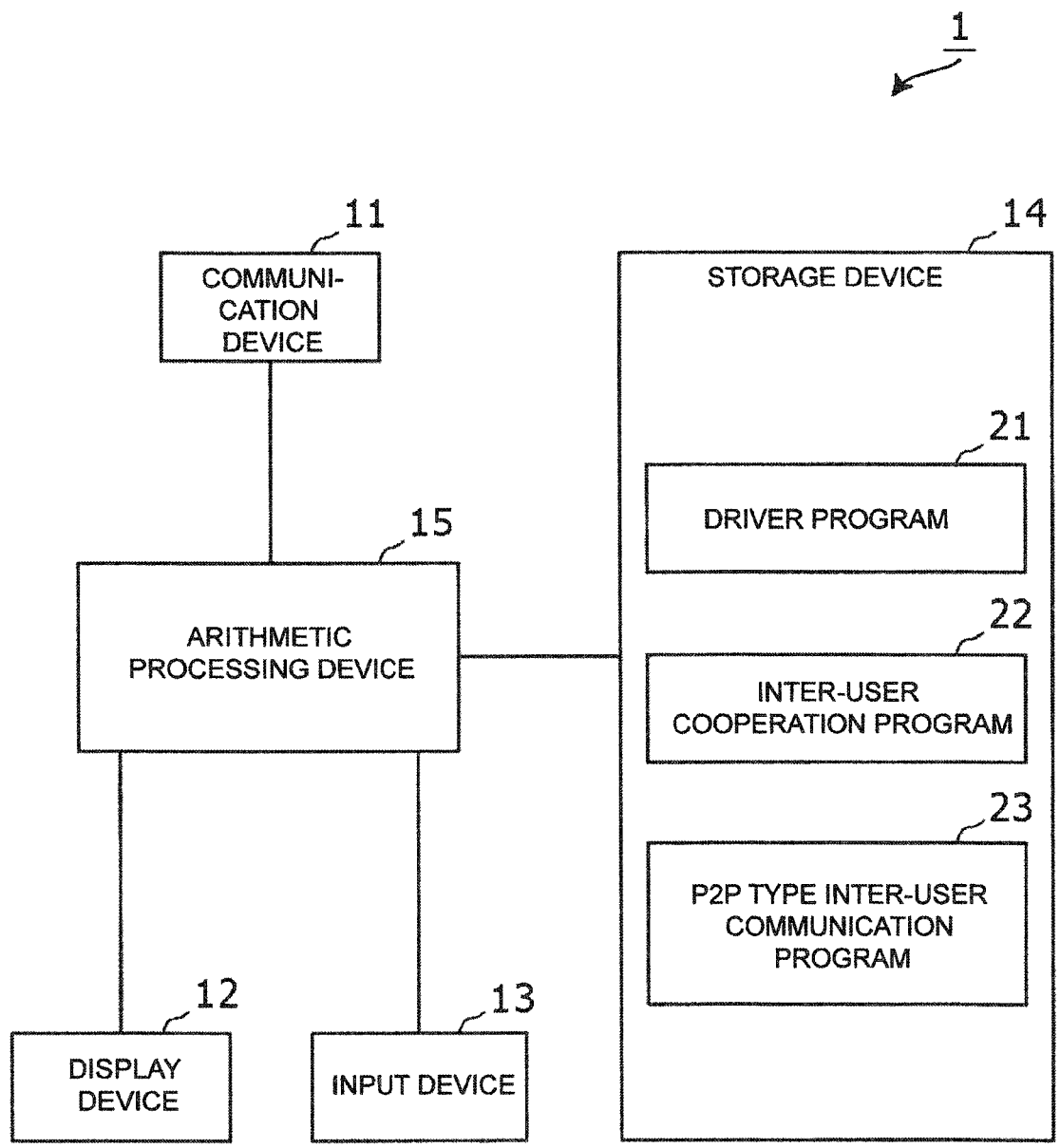
FIG. 3 is a block diagram illustrating an example configuration of a user terminal apparatus in FIG. 1.

FIG. 3 is a block diagram illustrating an example configuration of the user terminal apparatus 1 in FIG. 1.

A user terminal apparatus 1 illustrated in FIG. 3 is a personal computer, or the like, and includes a communication device 11, a display device 12, an input device 13, a storage device 14, and an arithmetic processing device 15.

The communication device 11 is a communication device, such as a network interface, and the like, which is connectable to the computer network 2 by wireless communication or wire communication.

The display device 12 is a liquid crystal display, or the like, and displays various types of information to a user. The input device 13 is a touch panel, a keyboard, or the like, and detects a user operation.

The storage device 14 is a non-volatile storage device, such as a flash memory, a hard disk drive, and the like, and stores various types of programs and data.

A driver program 21, an inter-user cooperation program 22, and a P2P type inter-user communication program 23 are stored in the storage device 14.

The driver program 21 is a program used for controlling the image forming apparatus 3 to cause the image forming apparatus 3 to remotely execute printing or the like.

The inter-user cooperation program 22 is a program used for executing processing, which will be described later.

The P2P type inter-user communication program 23 is a client side program of the peer-to-peer type inter-user communication service.

The arithmetic processing device 15 includes a computer including a central processing unit (CPU), a read-only memory (ROM), a random access memory (RAM), and the like, loads a program stored in the ROM or the storage device 14 in the RAM, and executes the program in the CPU.

Figure 4:
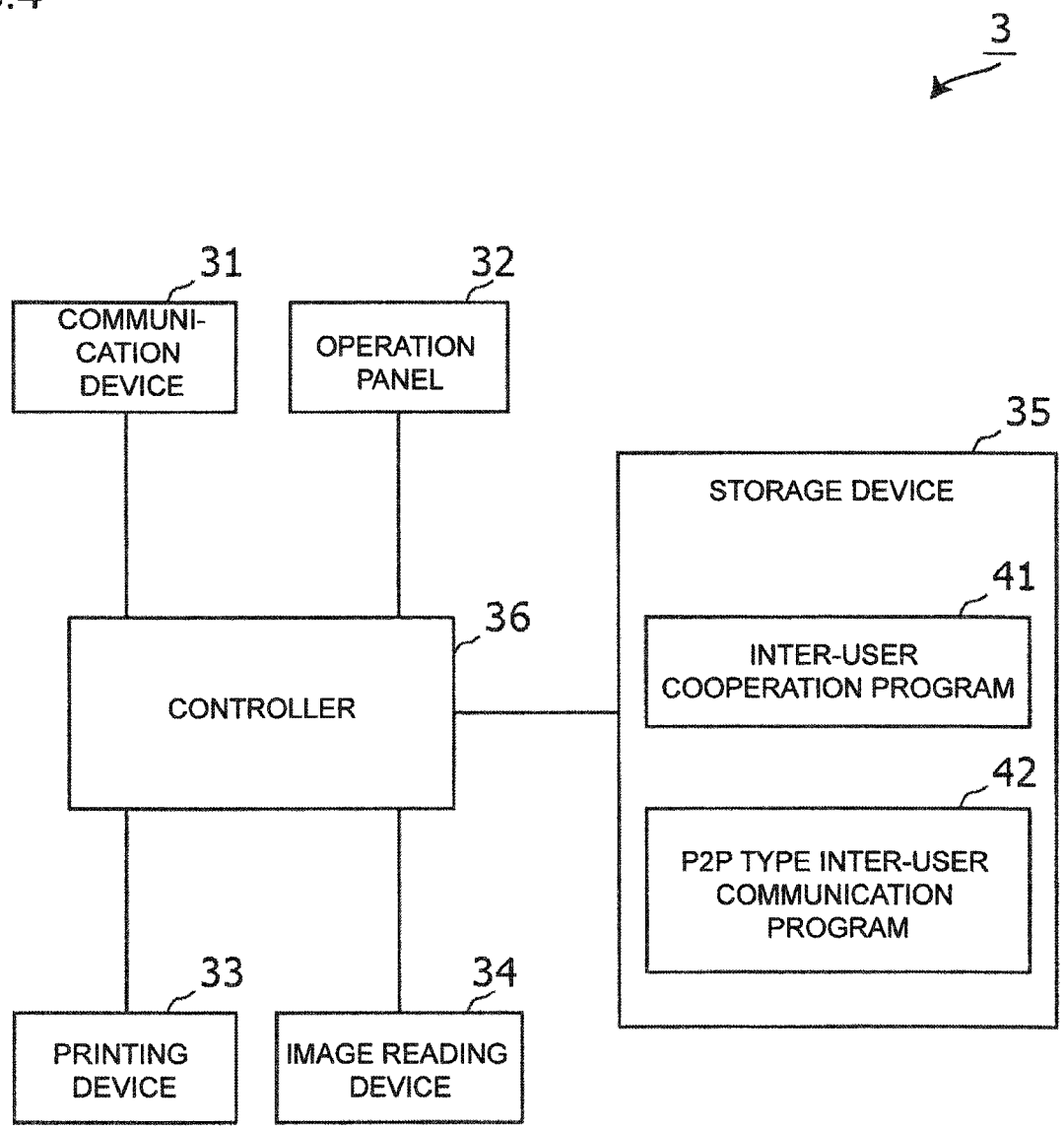
FIG. 4 is a block diagram illustrating an example configuration of an image forming apparatus in FIG. 1.

FIG. 4 is a block diagram illustrating an example configuration of the image forming apparatus 3 in FIG. 1.

An image forming apparatus 3 illustrated in FIG. 4 is a multifunctional machine and includes a communication device 31, an operation panel 32, a printing device 33, an image reading device 34, a storage device 35, and a controller 36.

The communication device 31 is a communication device, such as a network interface, and the like, which is connectable to the computer network 2 by wireless communication or wire communication.

The operation panel 32 includes a display device, such as a liquid crystal display and the like, and an input device, such as a touch panel, and the like.

The printing device 33 is an internal device that executes printing on a recording paper in accordance with a print request.

The image reading device 34 is an internal device that optically reads an original image of an original placed on an original placing table or the like, and generates image data of an original image.

The storage device 35 is a non-volatile storage device, such as a flash memory, a hard disk drive, and the like, and stores various types of programs and data.

An inter-user cooperation program 41 and a P2P type inter-user communication program 42 are stored in the storage device 35.

The inter-user cooperation program 41 is a program used for executing processing, which will be described later.

The P2P type inter-user communication program 42 is a client side program of the peer-to-peer type inter-user communication service.

The controller 36 controls internal devices, such as the printing device 33, the image reading device 34, and the like, and executes a program stored in the storage device 35 with a built-in computer.

Next, inter-user cooperation processing performed in the above-described system will be described.

(1) Inter-User Cooperation Processing Related to Printing

A case where a relationship among users is as illustrated in FIG. 2 and the user #1 performs printing with the image forming apparatus 3 will be hereinafter described.

Figure 5:
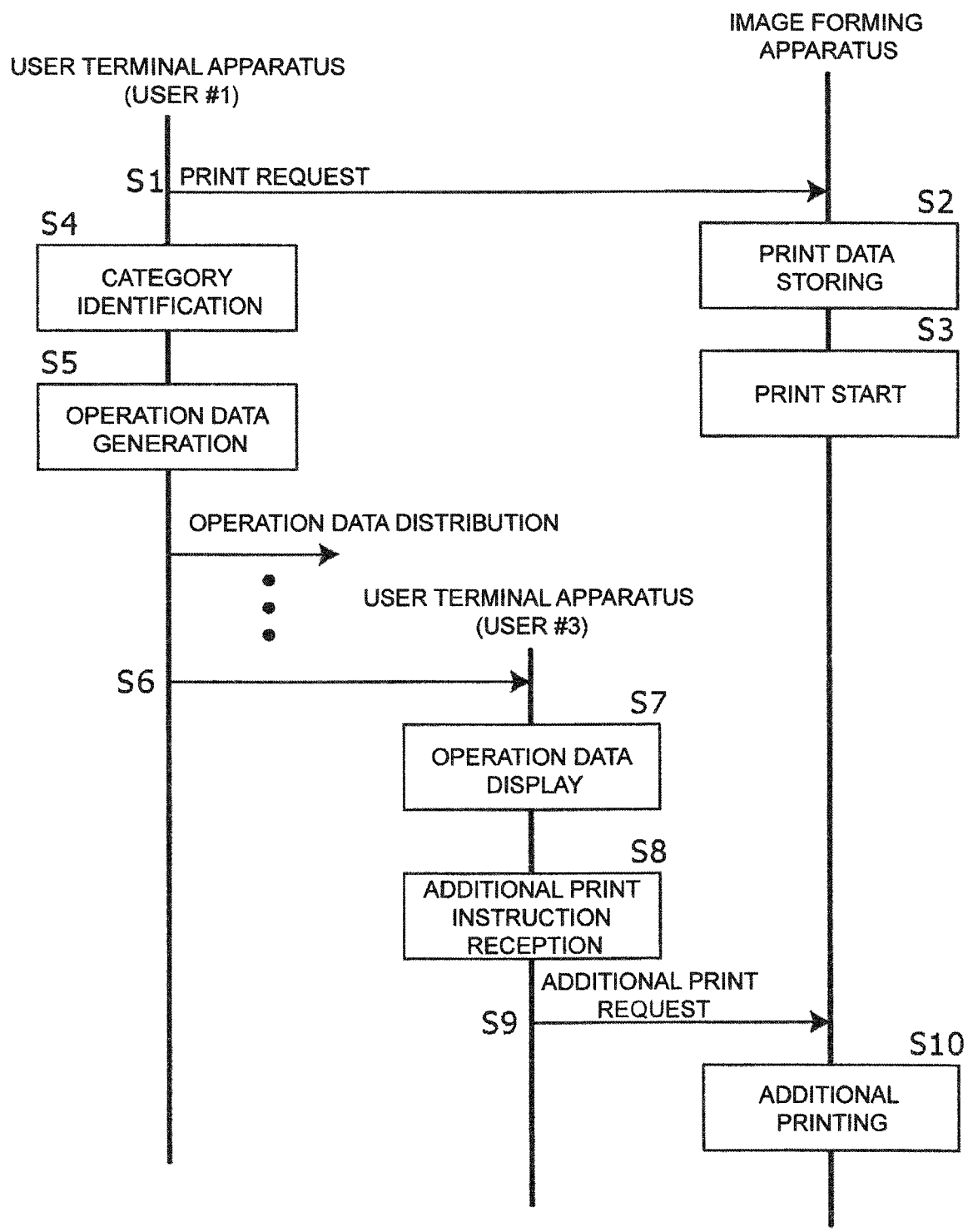
FIG. 5 is a sequence diagram illustrating inter-user cooperation processing performed when a print request is issued from a user terminal apparatus of a user to an image forming apparatus in the first embodiment.

FIG. 5 is a sequence diagram illustrating inter-user cooperation processing performed when a print request is issued from the user terminal apparatus 1 of the user #1 to the image forming apparatus 3 in the first embodiment.

In the user terminal apparatus 1 of the user #1, the arithmetic processing device 15 requests the image forming apparatus 3 to perform printing, on the basis of an operation of the user #1 detected by the input device 13 in accordance with the driver program 21 (Step S1). Specifically, in the user terminal apparatus 1, print data (for example, page description language (PDL) data) is generated from a document file and the generated print data is transmitted as a print request to the image forming apparatus 3 with the communication device 11.

In the imaging forming apparatus 3, the controller 36 receives the print data in the communication device 31, stores the print data in the storage device 35 (Step S2), and causes the printing device 33 to start printing based on the print data (Step S3).

In the user terminal apparatus 1 of the user #1, when the arithmetic processing device 15 detects a print request issued in accordance with the driver program 21, in accordance with the inter-user cooperation program 22, the arithmetic processing device 15 accesses the communication management server 4 using the P2P type inter-user communication program 23, acquires information of registered for the peer-to-peer type inter-user communication service, identifies, first, a category in a contact list, and then, identifies, for each category, whether or not to distribute operation data, and contents of the operation data (Step S4).

Note that a category to which the operation data is distributed, and contents (that is, items of information included in operation data) of operation data for each category to which operation data is distributed are specified as setting information of the inter-user cooperation program 22 and then stored by the user in advance.

Then, in accordance with the inter-user cooperation program 22, the arithmetic processing device 15 identifies a user included in the contact list of the user #1 for each category, on the basis of the acquired registration information, generates operation data for each category (Step S5), and distributes, using the P2P type inter-user communication program 23, the operation data for each category as a message on the peer-to-peer communication service, to all of users included in each category (Step S6).

For example, in the example illustrated in FIG. 2, the operation data for the category A includes operation data including (a) identification information of the user #1 and (b) setting information or image information of printing. In this case, since identification information of the image forming apparatus 3 is not included, the user #2 of the category A cannot request additional printing and only knows that the user #1 performed printing.

The operation data for the category B, on the other hand, includes operation data including (a) the identification information of the user #1, (b) identification information (for example, identification information, such as an IP address, and the like, on the computer network 2) of the image forming apparatus 3, and (c) setting information (color setting, size setting, and the like) or image information (a document image of document data used for printing, and the like) of printing. In this case, since the identification information of the image forming apparatus 3 is included, the user #3 of the category B may request additional printing.

In the user terminal apparatus 1 of the user #3, in accordance with the P2P type inter-user communication program 23, the arithmetic processing device 15 receives operation data using the communication device 11 and, when operation data is received in accordance with the P2P type inter-user communication program 23, the arithmetic processing device 15 displays the received operation data on the display device 12 in accordance with the inter-user cooperation program 22 (Step S7).

Figure 6:
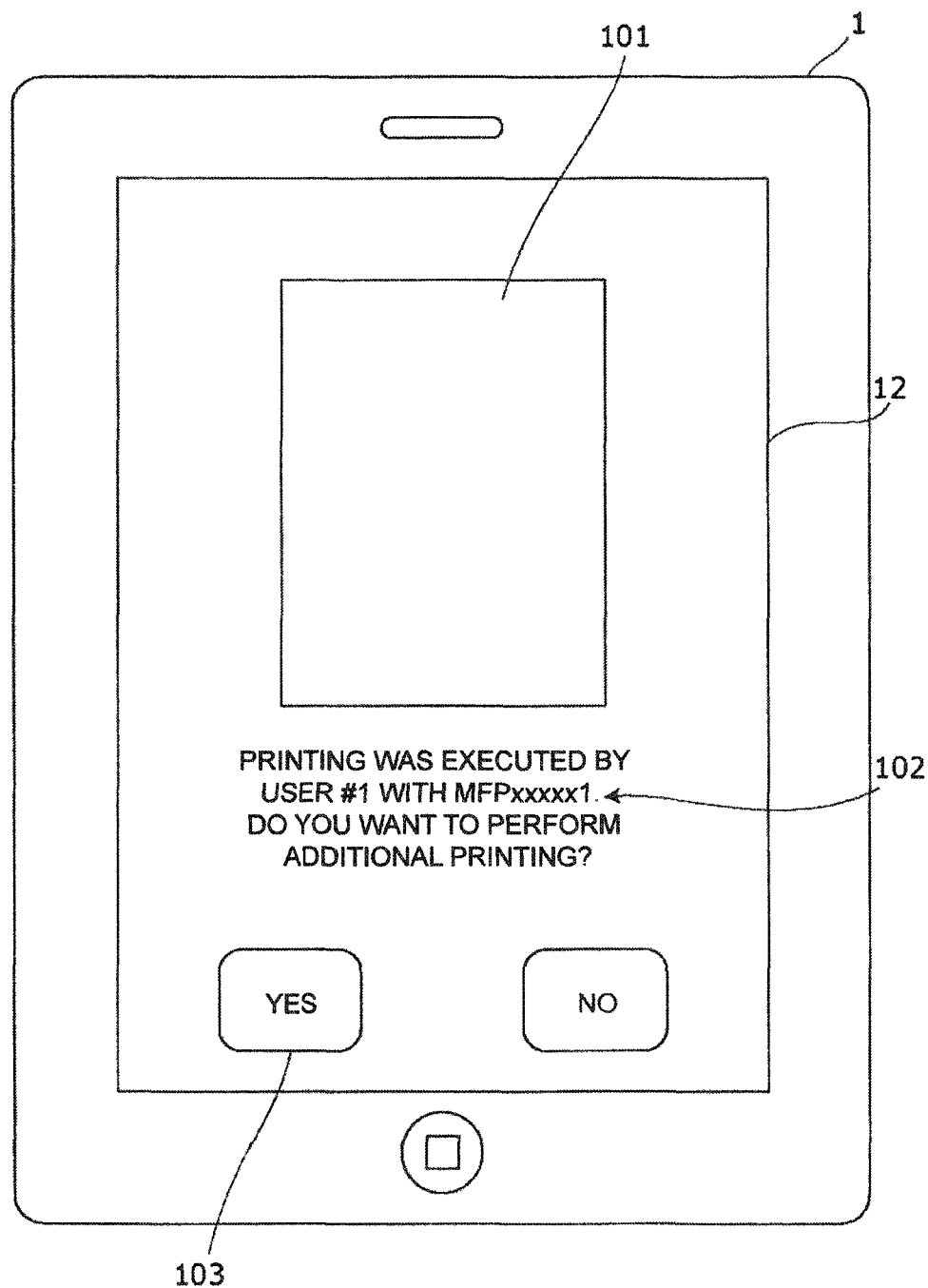
FIG. 6 is a view illustrating example operation data displayed on a user terminal apparatus of a user by inter-user cooperation processing when a print request is issued from the user terminal apparatus of the user to an image forming apparatus in the first embodiment.

FIG. 6 is a view illustrating example operation data displayed on the user terminal apparatus 1 of the user #3 by inter-user cooperation processing performed when a print request is issued from the user terminal apparatus 1 of the user #1 to the image forming apparatus 3 in the first embodiment.

For example, as illustrated in FIG. 6, a document image 101 about printing performed by the user #1, a message 102 indicating that the user #1 executed printing with the image forming apparatus 3 (the identification information: MFPxxxxx1), and a soft key 103 for use in instructing additional printing are displayed in the information processing unit 1 of the user #3.

Then, in the information processing unit 1 of the user #3, when the arithmetic processing device 15 detects an operation of the user #3 to the soft key 103 in the input device 13 (Step S8), in accordance with the inter-user cooperation program 22, the arithmetic processing device 15 transmits, using the communication device 11, an additional print request for additionally printing the same printed material for printing of the user #1, which was communicated by the received operation data, to the image forming apparatus 3 of the identification information communicated by the received data (Step S9). Note that the additional print request includes the identification information of the user #1.

In the image forming apparatus 3, in accordance with the inter-user cooperation program 41, the controller 36 receives an additional print request from the information processing unit 1 of the user #3 and executes additional printing for printing based on print data sent from the information processing unit 1 of the user #1, which was specified by the received additional print request, in the printing device 33 (Step S10).

Note that, if printing based on the print request made by the user #1 is not completed at the time of receiving the additional print request, the controller 36 increases the number of printed copies only for the user #3 (that is, by one) and then performs printing. On the other hand, if printing based on the print request made by the user #1 is completed at the time of receiving the additional print request, the controller 36 reads out stored print data and newly performs printing for the user #3 (that is, by one).

The control 36 may be configured not to perform additional printing at the time of receiving an additional print request but to perform, after the additional print request is received, additional printing on the basis of an operation (for example, a predetermined operation after the user logs in) performed on the operation panel 32 of the image forming apparatus 3 by the user #3. Thus, the user #3 may operate the image forming apparatus 3 to change the number of printed copies and the print setting to those desired by the user #3 and then perform printing.

(2) Inter-User Cooperation Processing Related to Document Scanning

A case where a relationship among users is as illustrated in FIG. 2 and the user #1 performs document scanning in the image forming apparatus 3 will be hereinafter described.

Figure 7:
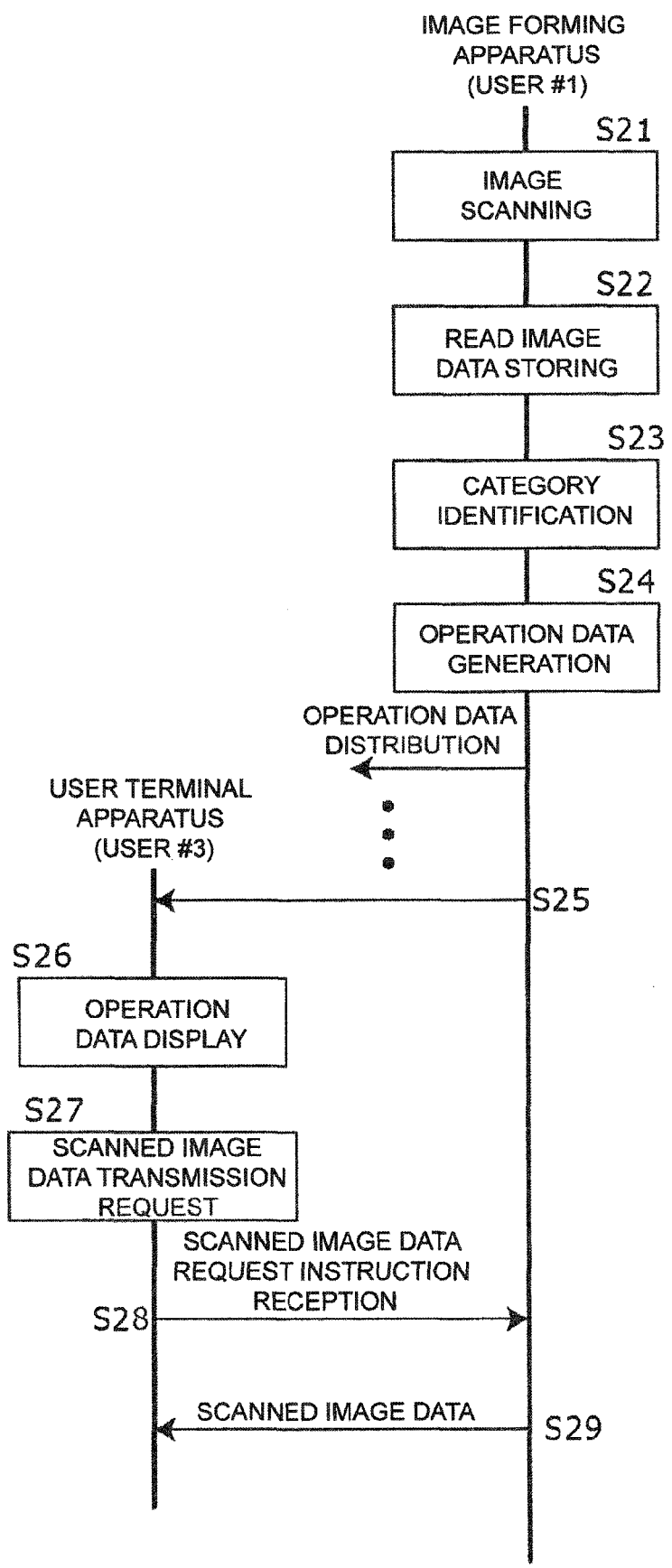
FIG. 7 is a sequence diagram illustrating inter-user cooperation processing performed when a user logs in at an image forming apparatus and executes document scanning in the first embodiment.

FIG. 7 is a sequence diagram illustrating inter-user cooperation processing performed when the user #1 logs in at the image forming apparatus 3 and executes document scanning in the first embodiment.

First, the user #1 operates the operation panel 32 of the image forming apparatus 3 to logs in and, after placing an original on the original placing table or the like, performs an operation for document scanning on the operation panel 32.

When the operation is detected on the operation panel 32, the controller 36 executes reading of a document image of the original in the image reading device 34 (Step S21), and stores the read image data read by the image reading device 34 (Step S22) while transmitting the read data to a destination that has been specified by the user #1, as appropriate.

Next, in accordance with the inter-user cooperation program 41, the controller 36 accesses the communication management server 4 using the P2P type inter-user communication program 42, acquires registration information of the user #1 registered for the peer-to-peer type inter-user communication service, first identifies a category in a contact list, and then, identifies, for each category, whether or not to distribute operation data, and contents of the operation data (Step S23).

For example, in the example illustrated in FIG. 2, the operation data for the category A includes operation data including (a) identification information of the user #1 and (b) setting information or image information of document scanning. In this case, since identification information of the image forming apparatus 3 is not included, the user #2 of the category A cannot request transmission of read image data and only knows that the user #1 performed document scanning.

The operation data for the category B, on the other hand, includes operation data including (a) the identification information of the user #1, (b) identification information of the image forming apparatus 3, and (c) setting information (color setting, resolution setting, and the like) or image information (read image data, size-reduced image data thereof, and the like) of the document scanning. In this case, since the identification information of the image forming apparatus 3 is included, the user #3 of the category B may request transmission of the read image data.

Note that a category to which operation data is distributed and the contents (that is, items of information included in the operation data) of the operation data for each category to which the operation data is distributed have been specified as setting information of the inter-user cooperation program 41 and stored by the user in advance.

Then, in accordance with the inter-user cooperation program 41, the controller 36 identifies a user included in the contact list of the user #1 for each category on the basis of acquired registration information, generates operation data for each category (Step S24), and distributes, using the P2P type inter-user communication program 42, the operation data for each category as a message on the peer-to-peer communication service to all of users included in each category (Step S25).

In the user terminal apparatus 1 of the user #3, in accordance with the P2P type inter-user communication program 23, the arithmetic processing device 15 receives the operation data using the communication device 11 and, when the operation data is received in accordance with the P2P type inter-user communication program 23, the arithmetic processing device 15 displays the received operation data on the display device 12 in accordance with the inter-user cooperation program 22 (Step S26).

Then, in the information processing unit 1 of the user #3, when the arithmetic processing device 15 detects an operation of the user #3 for requesting transmission of read image data in the input device 13 (Step S27), in accordance with the inter-user cooperation program 22, the arithmetic processing device 15 transmits, using the communication device 11, a transmission request for transmitting the read image data acquired by document scanning performed by the user #1, which was communicated by the received operation data, to the image forming apparatus 3 of the identification information communicated by the received data (Step S28). Note that the transmission request includes the identification information of the user #1.

In the image forming apparatus 3, in accordance with the inter-user cooperation program 41, the controller 36 receives a transmission request from the user terminal apparatus 1 of the user #3 using the communication device 31, reads out the read image data acquired by document scanning performed by the user #1 identified by the received transmission request, and transmits the read image data to the user terminal apparatus 1 of the user #3 (Step S29).

(3) Inter-User Cooperation Processing Related to Document Copying

A case where a relationship among users is as illustrated in FIG. 2 and the user #1 performs document copying with the image forming apparatus 3 will be hereinafter described.

Figure 8:
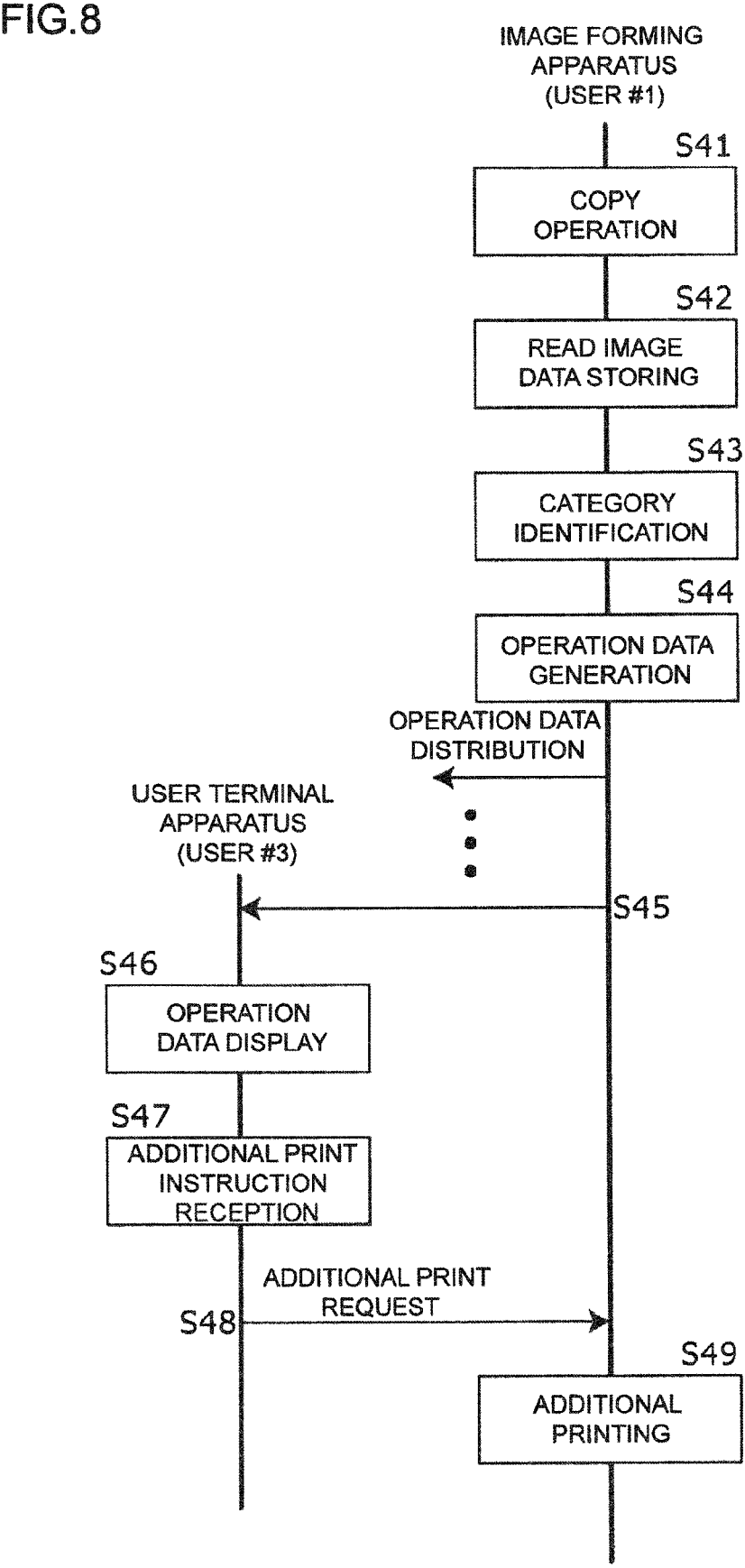
FIG. 8 is a sequence diagram illustrating inter-user cooperation processing performed when a user logs in at an image forming apparatus and executes document copying in the first embodiment.

FIG. 8 is a sequence diagram illustrating inter-user cooperation processing performed when the user #1 logs in at the image forming apparatus 3 and executes document copying in the first embodiment.

First, the user #1 operates the operation panel 32 of the image forming apparatus 3 to log in and performs, after placing an original on an original placing table or the like, an operation for document copying on the operation panel 32.

When the operation is detected by the operation panel 32, the controller 36 executes reading of an original image of the original in the image reading device 34 and printing of the read image in the printing device 33 (Step S41). At execution of the reading and the printing, the controller 36 stores image data read by the image reading device 34 (Step S42).

Next, in accordance with the inter-user cooperation program 41, the controller 36 accesses the communication management server 4 using the P2P type inter-user communication program 42, acquires registration information of the user #1 registered for a peer-to-peer type inter-user communication service, identifies, first, a category in a contact list, and then, identifies, for each category, whether or not to distribute operation data, and contents of the operation data (Step S43).

For example, in the example illustrated in FIG. 2, the operation data for the category A includes operation data including (a) identification information of the user #1 and (b) setting information or image information of document copy. In this case, since identification information of the image forming apparatus 3 is not included, the user #2 of the category A cannot request transmission of the read image data and only knows that the user #1 performed document copying.

The operation data for the category B, on the other hand, includes operation data including (a) the identification information of the user #1, (b) identification information of the image forming apparatus 3, and (c) setting information (color setting, resolution setting, and the like) or image information (the read image data, size-reduced image data thereof, and the like) of document copying. In this case, since the identification information of the image forming apparatus 3 is included, the user #3 of the category B may request additional printing.

Note that a category to which the operation data is distributed, and contents (that is, items of information included in the operation data) of the operation data for each category to which the operation data is distributed are specified as setting information of the inter-user cooperation program 41 and stored by the user in advance.

Then, in accordance with the inter-user cooperation program 41, the controller 36 identifies a user included in the contact list of the user #1 for each category on the basis of the acquired registration information, generates operation data for each category (Step S44), and distributes, using the P2P type inter-user communication program 42, the operation data for each category as a message on the peer-to-peer communication service (Step S45).

In the user terminal apparatus 1 of the user #3, in accordance with the P2P type inter-user communication program 23, the arithmetic processing device 15 receives the operation data using the communication device 11 and, when the operation data is received in accordance with the P2P type inter-user communication program 23, the arithmetic processing device 15 displays the received operation data on the display device 12 in accordance with the inter-user cooperation program 22 (Step S46).

Then, in the information processing unit 1 of the user #3, when the arithmetic processing device 15 detects an operation of the user #3 for additional printing in the input device 13 (Step S47), in accordance with the inter-user cooperation program 22, the arithmetic processing device 15 transmits, using the communication device 11, an additional print request for additionally printing the same printed material for document copying of the user #1, which was communicated by the received operation data, to the image forming apparatus 3 of the identification information communicated by the received operation data (Step S48). Note that the additional print request includes the identification information of the user #1.

In the image forming apparatus 3, in accordance with the inter-user cooperation program 41, the controller 36 receives an additional print request from the information processing unit 1 of the user #3 and executes additional printing for printing based on document copying performed by the user #1, which was specified by the received additional print request, in the printing device 33 (Step S49).

Note that, if printing based on document copying performed by the user #1 is not completed at the time of receiving the additional print request, the controller 36 increases the number of printed copies only for the user #3 (that is, by one) and then performs printing. On the other hand, if printing based on document copying performed by the user #1 is completed at the time of receiving the additional print request, the controller 36 reads out stored print data and newly performs printing for the user #3 (that is, by one).

The control 36 may be configured not to perform additional printing at the time of receiving an additional print request but to perform, after the additional print request is received, additional printing on the basis of an operation (for example, a predetermined operation after the user logs in) performed on the operation panel 32 of the image forming apparatus 3 by the user #3. Thus, the user #3 may change the number of printed copies and print setting to those desired by the user #3 and then perform printing.

As described above, according to the first embodiment, when requesting the image forming apparatus 3 to perform printing on the basis of an operation of a first user, the user terminal apparatus 1 of the first user identifies other users included in a contact list of the first user on the basis of registration information of the first user registered for a peer-to-peer type inter-user communication service, and distributes operation data including (a) identification information of the first user, (b) identification information of the image forming apparatus 3, and (c) related information of the printing to the identified other users. The user terminal apparatus 1 of a second user included in the other users receives the operation data to display it, and transmits, on the basis of an operation of the second user, an additional print request for additionally printing the same printed material for printing of the first user, which was communicated by the received operation data, to an image processing device of identification information communicated by the received operation data.

Thus, operation data is immediately communicated from the first user to the second user via the peer-to-peer type inter-user communication service, an additional print request is issued from the user terminal apparatus 1 of the second user to the image forming apparatus 3 directly (that is, not via the user terminal apparatus 1 of the first user), and therefore, when the first user generates a printed material or image data with the image forming apparatus 3, the other users may reliably acquire a printed material or image data of the same image with the image forming apparatus.

Second Embodiment

A system according to a second embodiment has a similar configuration to that of the system according to the first embodiment and is configured to disperse and distribute, when a user receives operation data, received moving picture data to another user and allow the another user who received the moving picture data through dispersion and distribution to request additional printing and read image data, too.

Dispersion and distribution of operation data in printing will be hereinafter described, but dispersion and distribution of operation data in document scanning and document copying are also possible in a similar manner.

Figure 9:
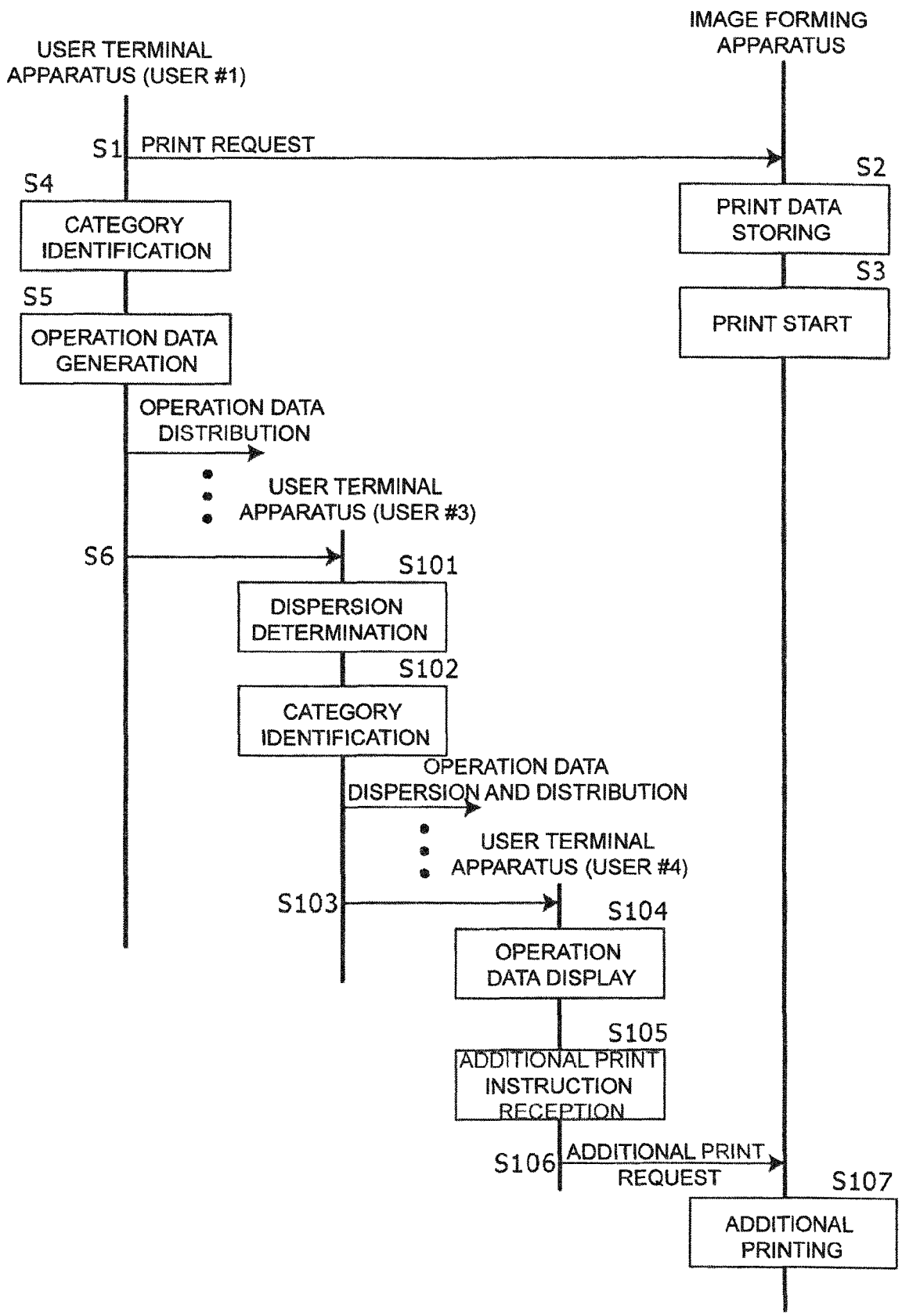
FIG. 9 is a sequence diagram illustrating inter-user cooperation processing performed when a print request is issued from a user terminal apparatus of a user to an image forming apparatus in a second embodiment.

FIG. 9 is a sequence diagram illustrating inter-user cooperation processing performed when a print request is issued from the user terminal apparatus 1 of the user #1 to the image forming apparatus 3 in the second embodiment. Note that a case where a relationship among users is as illustrated in FIG. 2 and the user #1 performs printing with the image forming apparatus 3.

In the second embodiment, similar to the example of the first embodiment, in a case where the user #1 makes a print request, in the user terminal apparatus 1 of the user #3, when operation data is received, in accordance with the inter-user cooperation program 22, the arithmetic processing device 15 identifies dispersion and distribution setting associated with the operation data or dispersion and distribution setting associated with a user (that is, the user #1 in this case) communicated by the operation data, and determines, on the basis of the identified dispersion and distribution setting, whether or not to execute dispersion and distribution (Step S101). If it is determined not to execute dispersion and distribution, dispersion and distribution, which will be described later, are not executed.

Note that dispersion and distribution setting includes information on whether or not to permit dispersion and distribution, and the like. Also, the dispersion and distribution setting associated with the operation data is, for example, caused to be included in the operation data by the user terminal apparatus 1 of the user (the user #1 in this case) that is an issuer of the operation data. As another alternative, the dispersion and distribution setting associated with the user (the user #1 in this case) communicated by the operation data is stored, for example, as setting information of the inter-user cooperation program 22 of the user terminal apparatus 1 of the user in the user terminal apparatus 1 of the user in advance, and is transmitted with the operation data.

If it is determined to execute dispersion and distribution, in accordance with the inter-user cooperation program 22, the arithmetic processing device 15 in the user terminal apparatus 1 of the user #3 accesses a communication management server 4 using a P2P type inter-user communication program 23, acquires registration information of the user (that is, the user #3) of the user terminal apparatus 1, registered for a peer-to-peer type inter-user communication service, identifies, first, a category in the contact list of the user (that is, the user #3) of the user terminal apparatus 1, and then, identifies, for each category, whether or not to disperse and distribute the operation data, on the basis of the registration information (Step S102).

Note that a category for which the user #3 permits dispersion and distribution is stored as setting information of the inter-user cooperation program 22 in advance, and a category to which the operation data is dispersed and distributed is identified in accordance with the setting information.

Then, in accordance with the inter-user cooperation program 22, the arithmetic processing device 15 identifies a user included in a category that is a target of dispersion and distribution among users included in the contact list of the user #3, on the basis of the acquired registration information, and disperses and distributes, using the P2P type inter-user communication program 23, the received operation data, as a message on the peer-to-peer communication service, to the identified user (Step S103).

For example, in the example illustrated in FIG. 2, if dispersion and distribution to the category B is permitted by the user #3, the operation data is dispersed and distributed to the user #4.

In the user terminal apparatus 1 of the user #4, in accordance with the P2P type inter-user communication program 23, the arithmetic processing device 15 receives the operation data using the communication device 11 and, when the operation data is received in accordance with the P2P type inter-user communication program 23, the arithmetic processing device 15 displays the received operation data on the display device 12, for example, as illustrated in FIG. 6, in accordance with the inter-user cooperation program 22 (Step S104).

Then, in the information processing unit 1 of the user #4, when the arithmetic processing device 15 detects an operation of the user #4 to the soft key 103 in the input device 13 (Step S105), in accordance with the inter-user cooperation program 22, the arithmetic processing device 15 transmits, using the communication device 11, an additional print request for additionally printing the same printed material for printing of the user #1, which was communicated by the received operation data, to the image forming apparatus 3 of the identification information communicated by the received data (Step S106). Note that the additional print request includes the identification information of the user #1.

In the image forming apparatus 3, in accordance with the inter-user cooperation program 41, the controller 36 receives an additional print request from the information processing unit 1 of the user #4 and executes additional printing for printing based on print data sent from the information processing unit 1 of the user #1, which was specified by the received additional print request, in the printing device 33 (Step S107).

Note that, similar to the first embodiment, the user #3 may execute additional printing also in the second embodiment.

Note that the above-described embodiments are preferred examples, but the present disclosure is not limited to the above-described embodiments and various modifications and changes may be made thereto without departing from the gist of the present disclosure.

For example, in the above-described first and second embodiments, the image forming apparatus 3 may be a printer.

In the second embodiment, when document scanning or document copying is performed by the image reading device 34, dispersion and distribution setting may be changed in accordance with whether an original is placed on the original placing table (a platen glass) or an original is placed on an automatic original feeder (ADF). If an original is placed on the original placing table (the platen glass), the original is highly likely to be a printed book, and if an original is placed on the ADF, the original is highly lightly to be a printed material. Therefore, considering a copyright of the original, dispersion and distribution may be prohibited if the original is placed on the original placing table (the platen glass), and may be permitted if the original is placed on the ADF. If it is determined that there is not a page number in a margin area in an read image even when an original is placed on the original placing table (the platen glass), dispersion and distribution may be permitted. Also, if it is determined that there is a page number in a margin area in a read image even when an original is placed on the ADF, dispersion and distribution may be prohibited.

Furthermore, in the second embodiment, a category for which dispersion and distribution are permitted may be a predetermined category including only users who belong to an organization, such as a company, and the like. Thus, a probability that an in-house confidential document and the like of a company are dispersed and distributed is reduced.

Furthermore, in the first and second embodiments, the system may be configured such that, when the user terminal apparatus 1 of a user who is a target of distribution or dispersion and distribution of operation data is outside a predetermined area, operation data is not distributed or not dispersed and distributed. In this case, for example, the system may be configured not to distribute or not to disperse and distribute operation data to a user who is not currently in a log-in state at the image processing device 1 coupled to an in-house LAN. The system may be configured such that, If a user who is a target of distribution or dispersion and distribution of operation data is currently in a log-in state at a peer-to-peer inter-user communication service and a current position (a position acquired by a GPS or the like) of the user terminal apparatus 1 used for the log in is on the premises of the company, the operation data is distributed or dispersed or distributed and, if not so, the operation data is not distributed or not dispersed and distributed.

Furthermore, in the first and second embodiments, the image forming apparatus 3 may be configured to communicate a user, the frequency of issuance of an additional print request or a transmission request for read image data of which is higher than a predetermined threshold, to an administrator.

Furthermore, in the first and second embodiments, if an image of a target of the corresponding one of printing, document scanning, and document copying matches a copyrighted work registered for a copyrighted work matching service that provides, as a cloud service, determination on whether or not a target image is a copy of a registered copyrighted work, an additional print request or a transmission request for read image data may be denied.

The present disclosure is applicable to, for example, a network system in which a plurality of users may use an image forming apparatus.

What is claimed is:

1. An image forming system comprising:
   a user terminal apparatus of a first user registered for a peer-to-peer type inter-user communication service;
   a user terminal apparatus of a second user registered for the peer-to-peer type inter-user communication service and included in a contact list of the first user; and an image forming apparatus, wherein
the user terminal apparatus of the first user and the user terminal apparatus of the second user execute a peer-to-peer type inter-user communication program that realizes inter-user communication using the peer-to-peer type inter-user communication service,
if the user terminal apparatus of the first user requests the image forming apparatus to perform printing on the basis of an operation of the first user, the user terminal apparatus of the first user identifies a user included in the contact list of the first user, on the basis of registration information of the first user registered for the peer-to-peer type inter-user communication service, and distributes operation data including (a) identification information of the first user, (b) identification information of the image forming apparatus, and (c) setting information or image information of the printing to the identified user,
the user terminal apparatus of the second user receives the operation data, displays the received operation data, and transmits, on the basis of an operation of the second user, an additional print request for additionally printing the same printed material for the printing of the first user, which was communicated by the received operation data, to the image forming apparatus of the identification information communicated by the received operation data, and
the image forming apparatus executes the printing on the basis of a request sent from the user terminal apparatus of the first user and, if the image forming apparatus receives the additional print request from the user terminal apparatus of the second user, the image forming apparatus executes additional printing for the printing based on a request sent from the user terminal apparatus of the first user.

2. An image forming system comprising:
an image forming apparatus at which a first user registered for a peer-to-peer type inter-user communication service logs in; and
a user terminal apparatus of a second user registered for the peer-to-peer type inter-user communication service and included in a contact list of the first user, wherein
the image forming apparatus and the user terminal apparatus of the second user execute a peer-to-peer type inter-user communication program that realizes inter-user communication using the peer-to-peer type inter-user communication service,
if the image forming apparatus executes document scanning or document copying on the basis of an operation of the first user in a log-in state, the image forming apparatus identifies, on the basis of registration information of the first user registered for the peer-to-peer type inter-user communication service, a user included in the contact list of the first user in a log-in state, and distributes operation data including (a) identification information of the first user, (b) identification information of the image forming apparatus, and (c) setting information or image information of the document scanning or the document copying,
the user terminal apparatus of the second user receives the operation data, displays the received operation data, and transmits, on the basis of an operation of the second user, an additional print request for additionally printing the same printed material for the document copying of the first user or a transmission request for transmitting read image data acquired by the document scanning or the document copying to the image forming apparatus of the identification information communicated by the received operation data, and
if the image forming apparatus receives the additional print request or the transmission request from the user terminal apparatus of the second user, the image forming apparatus executes additional printing for the document copying of the first user or transmission of the read image data to user terminal apparatus of the second user.

3. A non-transitory computer-readable recording medium on which is recorded an inter-user cooperation program executable by a computer of an electronic apparatus, wherein
the inter-user cooperation program for causing a computer provided in a user terminal apparatus of a user registered for a peer-to-peer type communication service to execute:
a user identification step of identifying, if a request for printing is made to an image forming apparatus on the basis of an operation of the user, a user included in a contact list of the user on the basis of registration information of the user registered for the peer-to-peer type inter-user communication service;
a distribution step of distributing operation data including (a) identification information of the user, (b) identification information of the image forming apparatus, and (c) setting information or image information of the printing to the identified user; and
a request transmission step of receiving the operation data from a user terminal apparatus of another user, displaying the received operation data, and transmitting, on the basis of an operation of the user, an additional print request for additionally printing the same printed material for the printing of the another user, which was communicated by the received operation data, to the image forming apparatus of the identification information communicated by the received operation data.

4. The non-transitory computer-readable recording medium according to claim 3, wherein
if the image forming apparatus executes document scanning or document copying on the basis of an operation of a logged-in user, the image forming apparatus identifies a user included in a contact list of the logged-in user on the basis of registration information of the logged-in user registered for the peer-to-peer type inter-user communication service, distributes operation data including (a) identification information of the logged-in user, (b) identification information of the image forming apparatus, and (c) setting information or image information of the document scanning or the document copying, and
the inter-user cooperation program further causes the computer to execute a step of receiving the operation data, displaying the received operation data from the image forming apparatus, and transmitting, on the basis of an operation of the user, an additional print request for additionally printing the same printed material for the document copying of the logged-in user or a transmission request for transmitting read image data acquired by the document scanning or the document copying, which was communicated by the received operation data, to the image forming apparatus of the identification information communicated by the operation data.

5. The non-transitory computer-readable recording medium according to claim 3, wherein
the inter-user cooperation program causes, when the operation data is received, the computer to further execute
a dispersion user identification step of identifying, on the basis of the registration information of the user of the user terminal apparatus, registered for the peer-topeer type inter-user communication service, a user included in the contact list of the user of the user terminal apparatus, and a dispersion and distribution step of dispersing and distributing the operation data to the identified user.

6. The non-transitory computer-readable recording medium according to claim 5, wherein in the dispersion user identification step, a user included in a specific category in the contact list of the user of the user terminal apparatus is identified on the basis of the registration information of the user of the user terminal apparatus, registered for the peer-to-peer type inter-communication service, and in the dispersion and distribution step, the operation data is dispersed and distributed to all of users included in the specific category.

7. The non-transitory computer-readable recording medium according to claim 5, wherein the inter-user cooperation program causes the computer to further execute a step of identifying dispersion and distribution setting associated with the operation data or dispersion and distribution setting associated with a user communicated by the operation data and determining, on the basis of the identified dispersion and distribution setting, whether or not to execute the dispersion and distribution step.

8. The non-transitory computer-readable recording medium according to claim 3, wherein in the user identification step, a user included in a specific category in the contact list of the user on the basis of the registration information of the user registered for the peer-to-peer type inter-user communication service, and in the distribution step, the operation data is distributed to all of users included in the specific category.

9. The non-transitory computer-readable recording medium according to claim 3, wherein in the user identification step, each of users included in a plurality of specific categories in the contact list of the user is identified on the basis of the registration information of the user registered for the peer-to-peer type inter-user communication service, and in the distribution step, the operation data including different contents for each of the categories is distributed to all of the users included in the plurality of specific categories.

* * * * *